Figure 1:
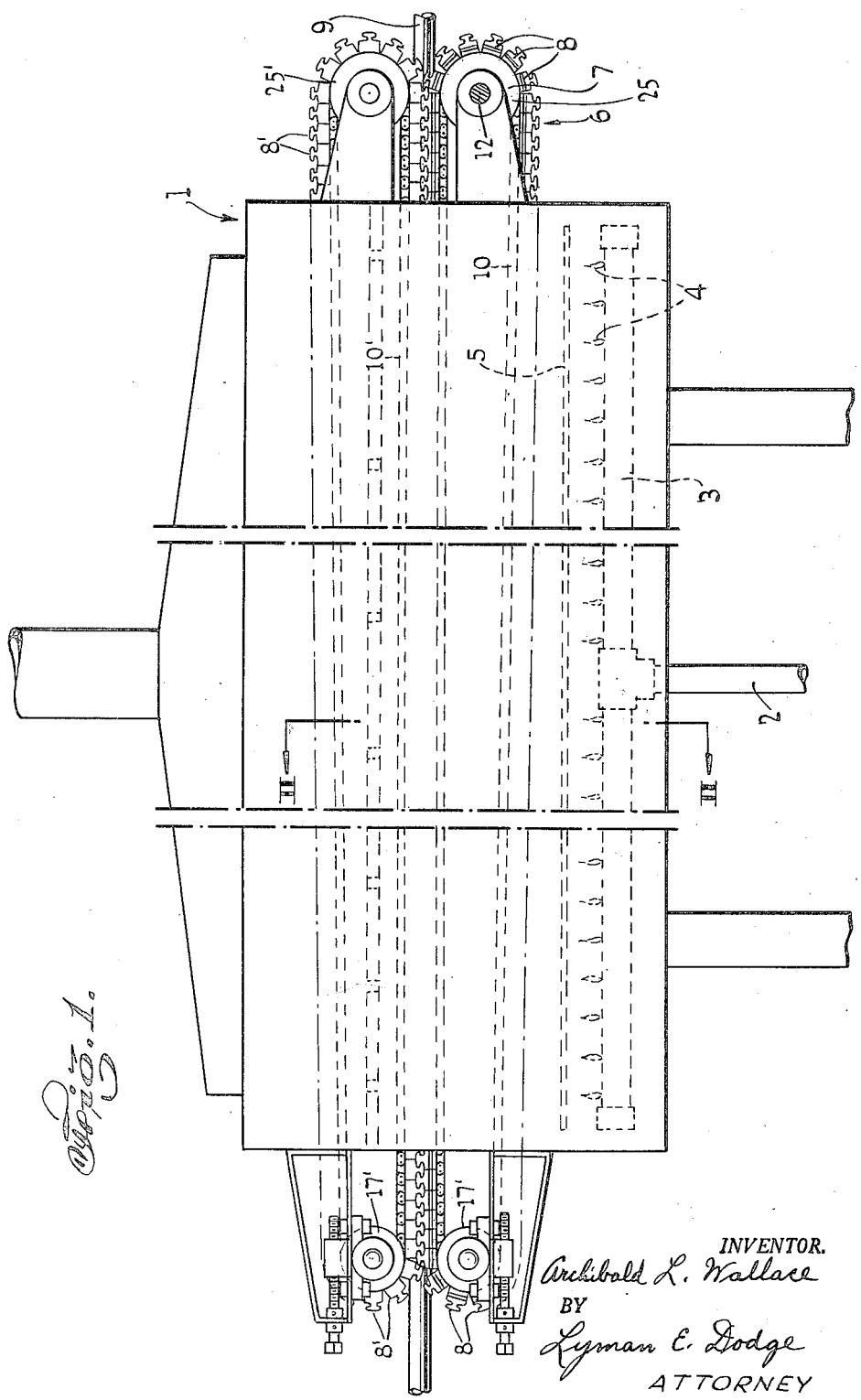

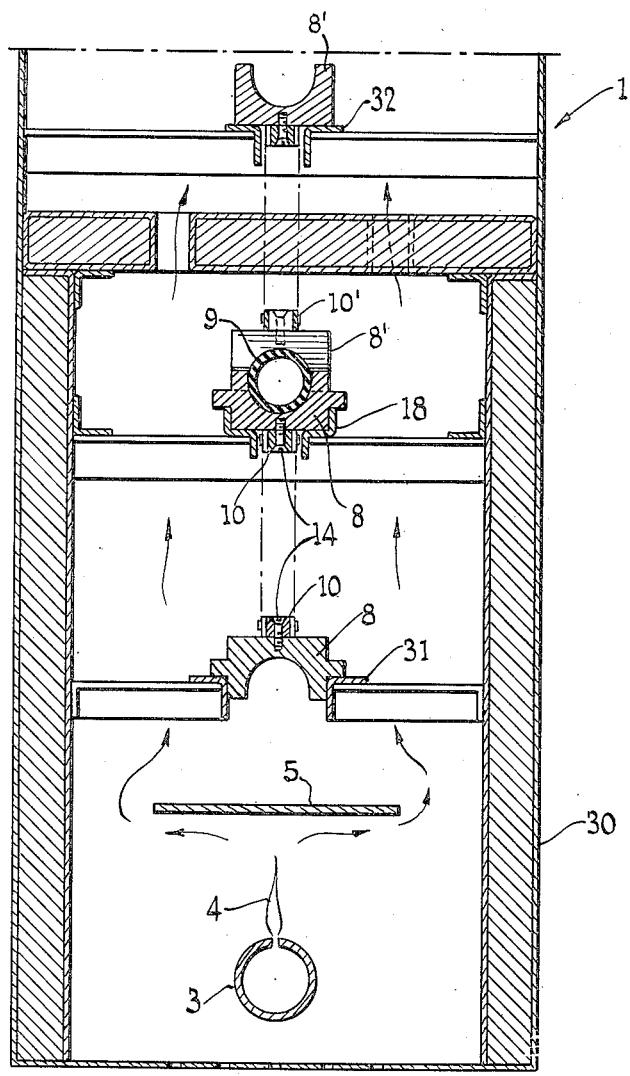

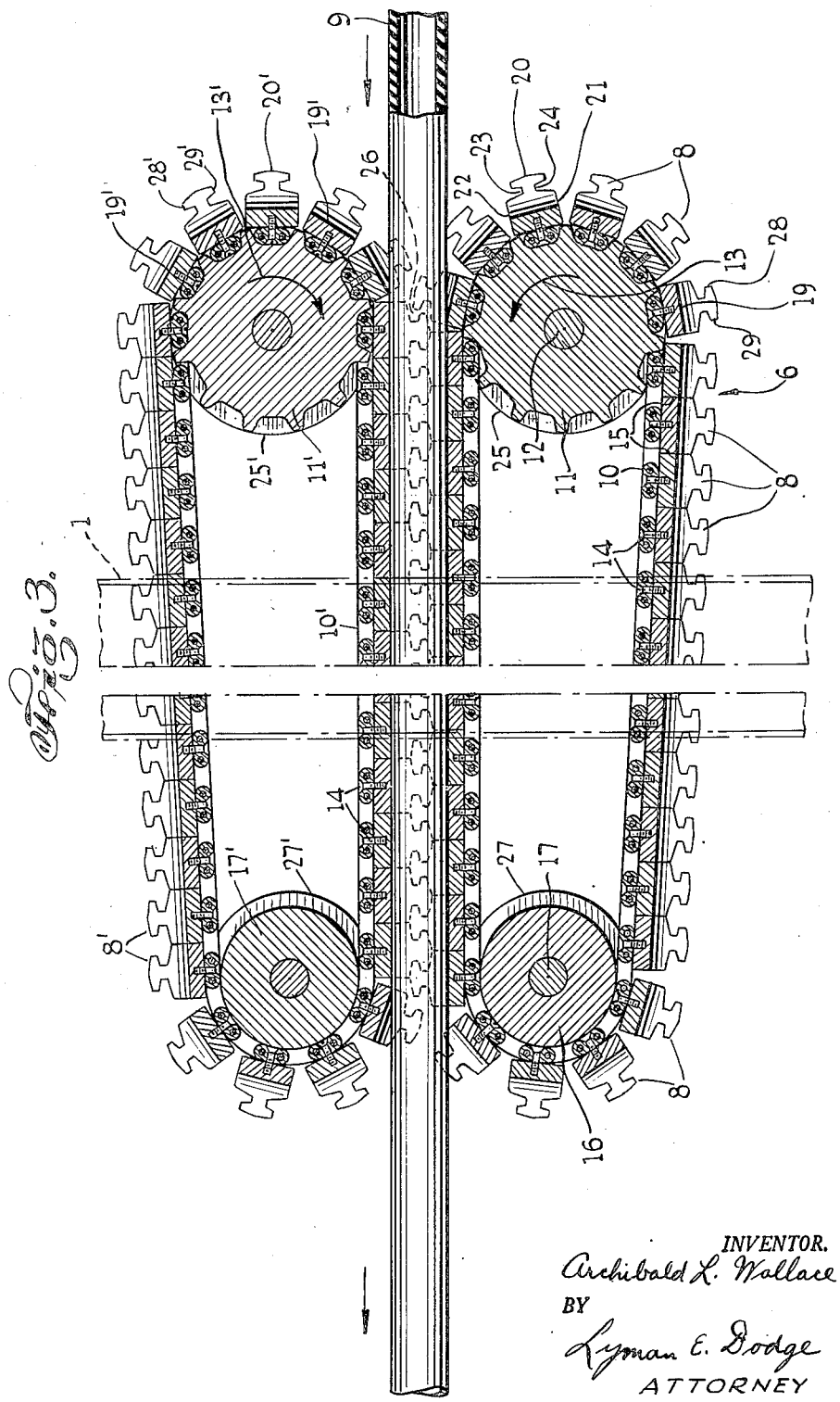

Patented Dec. 12, 1950

2,533,335

UNITED STATES PATENT OFFICE 2,533,335

VULCANIZING MOLD HAVING
INTERLOCKING SEGMENTS

Archibald L. Wallace, Mountain Lakes, N. J.

Application September 21, 1946, Serial No. 698,590

10 Claims. (Cl. 18—6)

This invention relates to a vulcanizing device.

A principal object of this invention is to provide a mold for vulcanizing which will permt the vulcanizing of articles in unrestricted lengths, if desired.

A further object of the invention is to provide a vulcanizing mold including a plurality of mold segments provided with integral means by which the segments may interlock one with the other.

Other objects and advantages will appear as the description of the particular physical embodiment selected to illustrate the invention progresses and the novel features will be particularly pointed out in the appended claims.

In describing the invention in detail and the particular physical embodiment selected to illustrate the invention, reference will be had to the accompanying drawings and the several views thereon, in which like characters of reference designate like parts throughout the several views, and in which:

Fig. 1 is a side elevational view of a vulcanizing device embodying my invention; Fig. 2 is a cross sectional view of the device as shown by Fig. 1 on the plane indicated by the line II—II viewed in the direction of the arrows at the ends of the line; Fig. 3 is a fragmentary side elevational view, showing some parts in section, of the sectional mold and driving means of my invention.

It is well understood by those skilled in the art of vulcanizing that articles made mainly of natural or synthetic rubber or rubber substitutes of the same general nature as synthetic rubber, must be vulcanized in order to give proper service in many cases. If the article to be vulcanized is of not too large dimensions, it is quite easy to provide a machine which will receive the entire article to be vulcanized, but in many cases, particularly in the case of such articles, as hose, which are required in very long pieces or lengths, it is impracticable to make a machine which is of such construction that it will subject the entire length of the article to vulcanization at any one time. This has necessitated the devising of vulcanizing machines, known as continuous vulcanizing machines, by which such large or long articles may be vulcanized in what is known as a continuous process, that is, machines which allow the article to be vulcanized to be passed therethrough with part of the article protruding from either end of the machine and intermediate portions only being successively subjected to the vulcanization process. Such a machine is shown, described, and claimed in my Patent No. 1,905,653, dated April 25, 1933. The present invention is directed to the production of a superior machine of the type shown and described in the said patent.

In general, machines for continuous vulcanizing comprise a chamber in which the temperature is suitably elevated and means to properly support, surround and maintain in proper form, the article to be vulcanized together with means for advancing the article at a proper rate through the vulcanizing chamber.

My invention is directed to the means for supporting, sustaining and maintaining an article in proper form and suitably advancing it through a vulcanizing chamber.

In Fig. 1 a vulcanizing chamber 1 is shown. This chamber may be of any of the usual and conventional designs and may have the temperature therein elevated by any suitable or appropriate means, such as by the burning of gas therein. This gas may, in accordance with ordinary usage, be introduced by the pipe 2 to the interior distributing pipe 3 which may be provided with a plurality of small openings through which the gas may issue and, upon being ignited, burn, forming the flames as 4. A baffle 5 may be positioned above the gas flames so that the heat, instead of being allowed to impinge directly upon the article to be vulcanized or the molds surrounding the article, will be distributed more uniformly.

The particular means which I have devised include a flexible belt or sprocket chain 6 movable by a pulley or sprocket wheel 7 and carrying a plurality of mold sections 8 arranged to cooperate with an identical flexible belt pulley and segments arranged so that the segments of the two belts interengage and interlock providing a means for surrounding, enclosing and holding to form an article, such as a hose 9, to be vulcanized.

The article to be vulcanized, here shown as a hose 9, is cylindrical in shape and hollow. One end of the hose 9 is entered at the right hand end of the device, as viewed in Fig. 1, and upon being seized by the mold segments 8, is carried along through the vulcanizing chamber. The length of time elapsing during which the hose 9 is within the vulcanizing chamber 1 is regulated by the speed of the pulleys, as 7. When the hose emerges from the left-hand end of the vulcanizing chamber, as shown in Fig. 1, it is completely vulcanized.

By selecting an article, such as a hose, for illustration, it is not to be concluded therefrom that my invention is limited solely to the vulcanization of a round article or a hose, because it is not intended to exclude other shapes and forms, even a flat sheet.

The vulcanizing chamber 1 and its arrangement of heating means is intended to be merely conventional and it is not intended to exclude by the particular showing any desired well known modifications or additions thereto, or heating agencies employed therein either singly or in combination.

The specific means for advancing an article to be vulcanized is more particularly shown in Fig. 3. In this figure a hose 9 is selected for illustration as an article to be vulcanized. The segments 8 are each attached to a sprocket chain 10 which is actuated by the sprocket wheel 11 rigidly attached to the driving means by a shaft 12. This shaft 12 causes the sprocket wheel to rotate in the direction of the arrow 13. Each segment 8 may be attached to the sprocket chain in any usual or conventional manner as by screws, as 14. The segments are positioned upon the sprocket chain so that when not passing around a sprocket wheel, or similar device, they abut side to side as at 15.

The sprocket chain 10 may be of any desired length, and depending upon its length the idler 16 is positioned at a greater or less distance from the sprocket wheel 11. This idler 16 rotates on or together with shaft 17.

As the shafts, as 12 and 17, are preferably placed with their axis horizontal in the vulcanizer, as shown in Fig. 1, it is preferable to position a guide 18 beneath the sprocket chain 10 so that as the sprocket chain travels from 11 to 16 it will be supported in substantially a plane, and that plane will be preferably horizontal. If the sag of the sprocket chain between 11 and 16 is not excessive or detrimental the guide 18 may be omitted.

On the upper side of the article to be vulcanized there is, in the preferred form, an identical arrangement with that hereinbefore described for positioning below the hose 9 and the parts therein are given the same designating numerals as those parts positioned below the hose 9 but with the addition of a prime.

Each of the segments, as 8, is formed with, preferably, a semi-circular cut-out portion, as 19, so that when the upper and lower segments come together, a cavity, circular in cross section, is formed by the two matching segments, so that it just fits the article to be vulcanized, in this case the round hose 9.

Each of the segments 8 is formed on what I will call the back face with a dove tail 20. This dove tail is formed so as to be somewhat elongated in a direction from a side 21 to a side 22 of a segment. The dove tail means further includes two slots, as 23 and 24, one on each side of the tail and each slot of a dimension such that it will receive one-half a tail, so that a segment on one side of the hose 9 will engage its tail with the slots of two segments positioned above hose 9 with the center line of the tail precisely in line with the plane of the contact between the two opposite adjacent segments, while one-half of the tails of each of these adjacent segments will fit into the slots on either side of the tail, all as well shown in Fig. 3 in that portion where the segments are shown in meshed position.

Each of the segments bears against an enlargement below the plane of the sprockets on the sprocket wheel 11, that is upon 25, so that as the several segments move around with sprocket wheel 11 in the direction of the arrow 13 they come into a position where they may meet with like segments upon sprocket wheel 11' and by reason of the bearing of the segments 8 and 8' upon the enlargements 25 and 25' and the proper positioning of the sprocket wheels 11 and 11' to each other the segments upon the sprocket chains cooperating with the two sprocket wheels will be nicely adjusted to precisely interengage one with the other as at 26. Of course it is to be understood that my means for guiding the segments into a position where they will properly engage has been described and illustrated as an enlargement of sprocket wheel 11, but it is to be understood that this is only a preferred way and that my invention contemplates any means positioned like 25 at the point where the upper and lower segments in Fig. 3 engage to position those segments so that they will properly engage. In short, I do not mean to exclude by their particular showing, a stationary guide over which the segments may roll to be moved into precise interengaging position.

It will be seen from an inspection of Fig. 3 that after the series of segments on one sprocket wheel have engaged the series of segments on the other sprocket wheel, the segments in the two series are interlocked and many closely embrace, confine and form the hose 9 in accordance with the shape of the cut-out portion 19. It is during the period that the hose 19 is confined between the segments that the vulcanization takes place and these segments hold to any proper form on the outer periphery.

It is to be understood that although I have shown no particular means for maintaining the internal bore of the hose 9, it is to be understood that for such members I may, if necessary, use any of the usual or conventional means and do not mean to exclude the use with my invention of mandrels within the hose 9 or compressed air applied to the hose 9 to maintain the internal bore in proper form and shape.

It is also to be understood that although I have shown no means such as is very commonly used to prevent transverse markings upon a hose, that my invention does not exclude the use of such means and that it is to be particularly understood that I may, if found necessary or desirable, make use of the metallic ribbons of my prior Patent 1,949,226, dated February 27, 1934, in conjunction with my invention as herein shown or may use the flexible steel strips of my prior Patent 2,187,254, dated January 16, 1940, between the faces 19 of the mold segments 8 and the hose 9.

The segments 8 are guided into engaging position by member 25. In the same manner they are positioned for disengagement by the enlargement 27 of idler 16. The enlargement 27 bears directly against the front face of each segment as it passes along and as enlargement 27 is positioned a definite and predetermined distance from 27', the segments in the two series are suitably positioned for disengagement when they reach the idlers 17 and 17'.

It will be noticed that the profile or cross section of the segments 8 is so formed that the segments of each series suitably and closely interengage and interlock with the other series. These surfaces may be made in various forms but I prefer the form shown in Fig. 3 and which I have called a dove tail form and in which the ends of the dove tails as at 28 and 29 are substantially the shape of a truncated wedge and the slots into which these dove tail ends fit are of the same shape. It is obvious that the two intermating parts, whatever their form, must be such that when the interlocking is accomplished the cutaway portion 19 and 19' will together form a proper form of orifice or through bore.

In Fig. 2 a transverse section of Fig. 1 shows the frame 30 of the vulcanizing chamber and also shows a supporting track, 31, upon which the sprocket chain and segments may be supported in moving from 16 to 11 in Fig. 3, and 32 designates a support upon which the sprocket chain 10' and segments may be supported in passing from 17' to 11'. At 18 is shown the support which prevents the sagging of the assembled segments in passing from the right side of the device, as Fig. 3, to the left side of the device.

It is to be understood that my invention is directed particularly to the new and novel mold constructed of a series of identical segments which have formed, integral therewith, means for holding them interlocked, and other features are shown either for the purpose of making my invention clearer or showing its possibilities.

Although my preferred form of construction and use is, as has hereinbefore been stated, that I may omit fastening the ends of the sprocket chain 10 together so that it will have two free ends, and then as it passes around the sprocket wheels 25 and 25', the segments will be locked together and when they pass the idlers 16 they will then remain together and, having completely passed the idlers 16, may be received on any suitable support and moved to a place where the short length of material to be vulcanized may be properly treated to secure proper vulcanization, that is, in short, I may form a mold by interlocking a predetermined number of segments and then treat the article held by these segments to effectuate the vulcanization and may thus hold several articles by separate lengths of interlocking segments which may be altogether treated in one heating arrangement to secure vulcanization.

It is to be understood that although I have illustrated and described one specific form only of interlocking segments I do not mean thereby to exclude other specific forms of segments for molds for vulcanizers which are adapted to be arranged in opposing series and advanced into juxtaposition so as to interengage and interlock where such segments are of such form that the interengaging surface may be made integrally with the segment and the segments are of substantially identical formation but reversely positioned.

Although I have particularly described one particular physical embodiment of my invention, nevertheless I desire to have it understood that the form selected is merely illustrative and does not exhaust the possible physical embodiments of the idea of means underlying my invention.

I claim:

1. A mold for a vulcanizer formed of a plurality of segments in two series, one reversely positioned to the other, each segment provided with identical dove tailing means, said means on each segment including a tail and two slots, one one each side of the tail, each slot of a dimension to receive one-half a tail, and the center line of a tail on one series positioned in line with the abutting surfaces of two segments in the opposite series, each segment further provided with a surface for engaging an article to be vulcanized.

2. A mold for a vulcanizer formed of a plurality of segments in two series, one reversely positioned to the other, each segment provided with identical dove tailing means, said means on each segment including a tail and two slots, one on each side of the tail, each slot of a dimension to receive one-half a tail, and the center line of a tail on one series positioned in line with the abutting surfaces of two segments in the opposite series, each segment further provided with a surface for engaging an article to be vulcanized and means to bring the tails and slots into engagement.

3. A mold for a vulcanizer formed of a plurality of segments in two series, one reversely positioned to the other, each segment provided with identical dove tailing means, said means on each segment including a tail and two slots, one on each side of the tail, each slot of a dimension to receive one-half a tail, and the center line of a tail on one series positioned in line with the abutting surfaces of two segments in the opposite series, each segment further provided with a cut-out portion for the reception of an article to be vulcanized.

4. A mold for a vulcanizer formed of a plurality of segments in two series, one reversely positioned to the other, each segment provided with identical dove tailing means, said means on each segment including a tail and two slots, one on each side of the tail, each slot of a dimension to receive one-half a tail, and the center line of a tail on one series positioned in line with the abutting surfaces of two segments in the opposite series, each segment further provided with a cut-out portion for the reception of an article to be vulcanized and means to bring the tails and slots into engagement.

5. A mold for a vulcanizer formed of a plurality of segments in two series, one reversely positioned to the other, each segment provided with identical dove tailing means, said means on each segment including a tail and two slots, one on each side of the tail, each slot of a dimension to receive one-half a tail, and the center line of a tail on one series positioned in line with the abutting surfaces of two segments in the opposite series, each segment further provided with a surface for engaging an article to be vulcanized, means to bring the tails and slots into engagement and means to disengage the tails.

6. A mold for a vulcanizer formed of a plurality of segments in two series, one reversely positioned to the other, each segment provided with identical dove tailing means, said means on each segment including a tail and two slots, one on each side of the tail, each slot of a dimension to receive one-half a tail, and the center line of a tail on one series positioned in line with the abutting surfaces of two segments in the opposite series, each segment further provided with a cut-out portion for the reception of an article to be vulcanized and means to bring the tails and slots into engagment, said last named means including spaced guiding surfaces abutting the segments whereby the segments of each series are predeterminately spaced from the other series during the period of entrance into engagement whereby the segments of one series are interlocked with the segments of the other series.

7. A mold for a vulcanizer formed of a plurality of segments in two series, one reversely positioned to the other, each segment provided with identical dove tailing means, said means on each segment including a tail and two slots, one on each side of the tail, each slot of a dimension to receive one-half a tail, and the center line of a tail on one series positioned in line with the abutting surfaces of two segments in the opposite series, each segment further provided with a cut-out portion for the reception of an article to be vulcanized and means to bring the tails and slots into engagement, said last named means including spaced guiding surfaces abutting the segments whereby the segments of each series are predeterminately spaced from the other series during the period of entrance into engagement whereby the segments of one series are interlocked with the segments of the other series and means to guide the segments in transverse alignment.

8. A mold section for a vulcanizer formed with an end and formed on the end with a protruding tooth supported by a reduced portion, the tooth and the reduced portion and the adjacent end of the main body of the mold section being of a form such that the tooth will fit into and fill a space between and formed by the placing of two identically formed mold sections side to side reversely opposite thereto, said mold section further formed with a semi-circular cut-out portion the axis of which is parallel with a line drawn longitudinally of such assembled mold section.

9. A mold section having two sides whereby it is adapted to abut two other mold sections placed one on one side thereof and one on the other, also having two end faces positioned at an angle to the side faces, also formed with a cut-out portion, the axis of which is perpendicular to the side faces, also a back face adapted to be attached to a belt, the material remaining of the face opposite the back face after taking out the cut-out portion, being formed into two teeth, one adjacent one end face and the other adjacent the other end face, each tooth being elongated in the line from side to side and connected to the body of the mold section by a neck narrower than the length of the tooth, the tooth being shorter than the distance from side to side of the mold section and the two portions of the mold section on each side of the neck being cut away whereby one mold section may be positioned with its back face in contact with the back faces on two adjacent reversely positioned mold sections each provided with an identical tooth whereby the mold sections are interlocked.

10. A mold section having two parallel sides whereby it is adapted to abut two other identical mold sections placed one on one side thereof and one on the other, also having two parallel end faces positioned at a right angle to the side faces, also formed with a semi-circular cut-out portion, the axis of which intersects the plane of the side faces perpendicular to the side faces, also a back face formed to be adapted to be attached to a belt, the material remaining of the face opposite the back face after taking out the cut-out portion, being formed into two teeth, one adjacent one end face and the other adjacent the other end face, each tooth being elongated in the line from side to side and connected to the body of the mold section by a neck narrower than the length of the tooth, the tooth being shorter than the distance from side to side of the mold section and the two portions of the mold section on each side of the neck being cut away whereby one mold section may be positioned with its back face in contact with the back faces on two adjacent reversely positioned mold sections each provided with an identical tooth whereby the mold sections are interlocked.

ARCHIBALD L. WALLACE.

REFERENCES CITED

The following references are of record in the file of this patent:

UNITED STATES PATENTS

| Number | Name | Date |
| --- | --- | --- |
| 724,588 | Koneman | Apr. 7, 1903 |
| 891,891 | Weston | June 30, 1908 |
| 1,127,925 | Schueler | Feb. 9, 1915 |
| 1,305,474 | Lewis | June 3, 1919 |
| 1,603,140 | Muller | Oct. 12, 1926 |
| 2,074,368 | Corner | Mar. 23, 1937 |